UNITED STATES PATENT OFFICE.

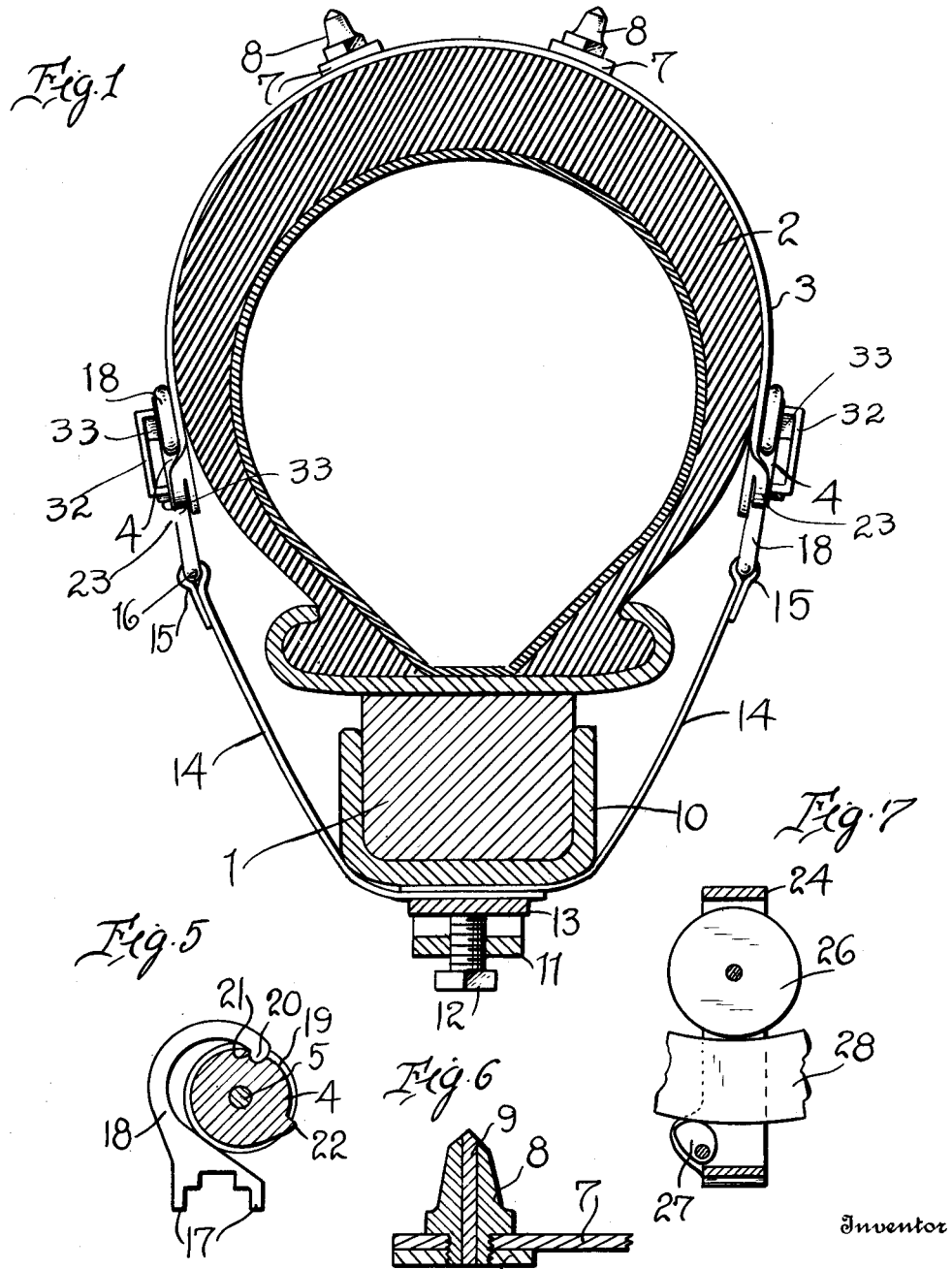

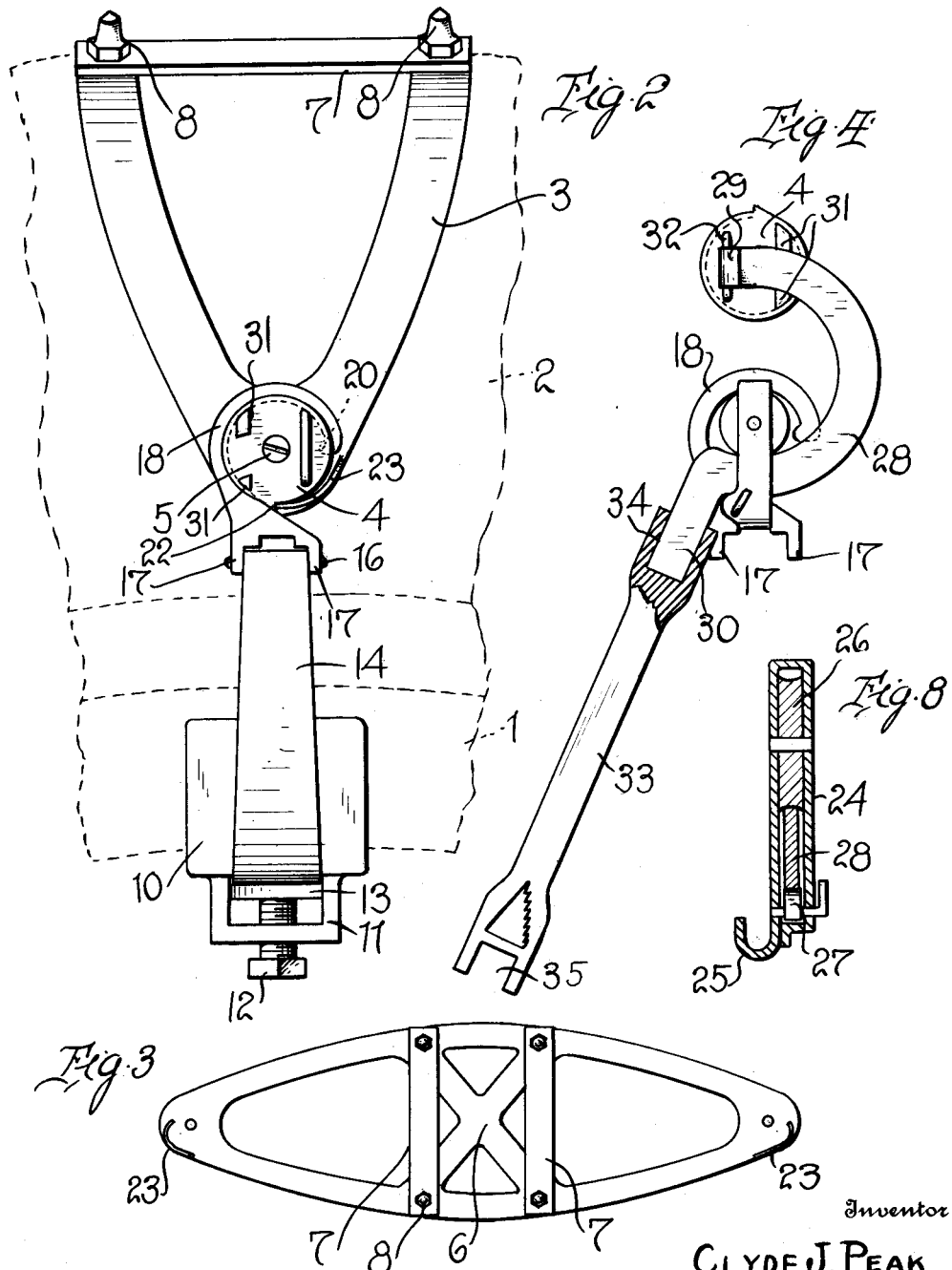

CLYDE J. PEAK, OF BARADA, NEBRASKA.

ANTISLIPPING SHOE FOR TIRES.

1,132,730.       Specification of Letters Patent.      Patented Mar. 23, 1915.

Application filed October 8, 1914. Serial No. 865,699.

*To all whom it may concern:*

Be it known that I, CLYDE J. PEAK, a citizen of the United States, residing at Barada, in the county of Richardson and State of Nebraska, have invented certain new and useful Improvements in Antislipping Shoes for Tires, of which the following is a specification, reference being had to the accompanying drawings.

This invention relates to attachments for vehicle wheels, and particularly to anti-slipping shoes for automobile tires or the like.

An object of this invention is the provision of an anti-slipping shoe which may be quickly and easily applied to the tire at any point along the circumference thereof, and which may be readily removed from the tire when not desired for use.

A further object of this invention is the provision of an anti-slipping shoe for automobile tires or the like, which will retain its adjusted position on the tire, either when the tire contains its maximum of air pressure or when the tire is partially deflated.

With these and other objects in view, my invention consists in the novel construction, combination and arrangement of parts to be hereinafter more fully described, claimed and illustrated in the accompanying drawings, in which—

Figure 1 is a transverse sectional view of a vehicle wheel showing my improved anti-slipping shoe mounted thereon; Fig. 2 is a fragmentary side elevational view of the rim and tire showing the shoe mounted thereon; Fig. 3 is a plan view of the shoe proper, showing the same before it is curved to conform to the curvature of the tire; Fig. 4 is an elevational view showing the manner of connecting my improved shoe to the tire; Fig. 5 is a detail view showing the engagement of one of the hooks with one of the rollers on the end of the shoe, before the roller is moved to locked position; Fig. 6 is a detail sectional view showing the manner of connecting one of the calks to the shoe; Fig. 7 is a detail sectional view showing one of the frames for use in connection with the hooks, when it is desired to engage the hooks with the rollers, and Fig. 8 is a sectional view of one of the frames taken at right angles to that shown in Fig. 7.

Referring more particularly to the drawings, the numeral 1 designates the rim of an automobile wheel or the like upon which a clencher tire 2 of the usual construction is mounted. Mounted on the tire is an elliptical band 3 which constitutes the shoe proper, the ends of the shoe being slightly enlarged to provide suitable bearing surfaces for the supporting rollers 4 which are journaled to the ends of the shoe by suitable bolts 5. The side portions of the band 3 are braced by a spider 6, the arms of the spider being connected to the side portions of the rim on opposite sides of the longitudinal center of the shoe, and secured to the shoe on opposite sides of its longitudinal center are transversely extending bars 7 in the opposite ends of which calks 8 are threadably mounted, the calks comprising a soft metal body and a core 9 of steel or other similar hard metal. By this arrangement of the bar 7, it will be seen that two pairs of calks are carried by the shoe, the pairs of calks being arranged in opposite sides of the longitudinal center of the shoe and the calks of each pair being arranged on opposite sides of the transverse center of the shoe.

Arranged against the inner face of the rim 1 is a U-shaped bracket 10 which is provided with an inwardly extending socket 11, the inner wall of which is formed with a threaded opening therein to receive a set screw 12 therethrough, the end of the screw within the socket being swivelly connected to a clamping plate 13. Disposed within the socket 11 between the inner face of the bracket 10 and the outer face of the clamping plate 13 are the inner ends of a pair of flat springs 14, the inner ends of the springs being arranged one against the other, and being secured in the socket by turning the screw 12 to force the clamping plate 13 against the ends of the springs. The outer end of each spring 14 is looped as at 15 to receive a pivot pin 16 therethrough, the longitudinally extending arms 17 of a hook 18 being adapted for engagement on the ends of the pin, whereby the hook 18 is pivotally connected to the outer or free end of each spring 14. The periphery of each roller 4 has a groove 19 formed therein to receive one of the hooks 18, and the extremity of each hook is provided with an inwardly extending lug 20, the lugs 20 being adapted for engagement in notches 21 in the peripheries of the rollers 4 so that when the hooks are connected with the rollers rotation of the rollers independently of the hooks is prevented. To prevent rotation of the rollers in a direction to release the hooks therefrom, an outwardly extending shoulder 22 is formed on the periphery of each roller, and formed integral with each end of the shoe is a spring tongue 23, the tongues being normally adapted to engage the shoulders 22.

It will be seen that the hooks 18 are held in engagement with the rollers 4 by reason of the tension of the springs 14, and to engage the hooks of either of the rollers against the tension of the springs, a pair of rectangular frames 24 are provided, the inner wall of each frame having a hook 25 formed on its inner end, said hooks 25 being adapted for engagement between the arms 17 on the inner ends of the hooks 18. Rotatably mounted within the frames at their outer ends are rollers 26, and eccentrically mounted in the frames at their inner ends are cams 27, the rollers 26 and cams 27 being spaced to receive curved bars 28 therebetween, the outer end of each bar being hooked as at 29 and the inner end of each bar having an angularly directed end 30. While in the drawings I have illustrated only one of the frames 24 and one of the bars 28, it will be readily understood that one of the bars and one of the frames is provided for use in connection with each hook 18 when it is desired to mount the hooks on or remove the same from the rollers 4. The outer face of each roller 4 at one side of its center is formed with a pair of spaced lugs 31 and secured in the outer face of each roller on the opposite side of its center is a loop 32, the loop 32 of each roller being adapted to receive the hooked end 29 of one of the bars 28, the portion of the bar inwardly of the hook being adapted to engage between the lugs 31. The parts of the device when in this position, are clearly shown in Fig. 4 of the drawings, and to move the hooks 18 into engagement with the rollers 4 against the tension of the springs 14, a lever 33 is provided, the lever having a socket 34 in one end to receive the angularly extending ends 30 of the bars 28. The other end of the lever 33 is provided with a socket 35 to provide a wrench, whereby the set screw 12 may be turned, and the calks rotated to engage the same with or disengage the same from the shoe.

In the practical use of my device, the member 3 which constitutes the shoe proper is curved to conform with the curvature of the tire, and is disposed transversely across the same, so that the rollers 4 are disposed on opposite sides of the tire. The bracket 10 is then arranged against the rim 1 of the wheel, and the inner ends of the springs 14 are arranged in the socket of the bracket and clamped therein by the clamping plate 13. With the hooks 18 connected to the free ends of the springs 14, the frames 24 are connected to the hooks by the hooks 25 of the frames, whereupon the bars 28 are disposed through the frames between the rollers 26 and the cams 27 therein, the hooked ends 29 of the bars being connected with the loops 32 carried on the outer faces of the rollers. The lever 33 is then arranged with the outer end 30 of one of the bars 28 engaged in the socket 34 of the lever, and the lever is moved to draw the hook 18 toward the roller 4 against the tension of the spring 14 to which the hook is connected, until the lug 20 on the hook is engaged in the notch 21 in the periphery of the roller, whereupon the cam 27 is turned to engage the bar 28 to prevent the hook from slipping off of the roller due to the tension of the spring. The lever 33 is then connected with the other bar 28 to engage the other hook 18 over the other roller 4, so that upon disengagement of the hook ends 29 of the bar 28 from the loops 32, the tension of the springs will serve to rotate the rollers 4 until the body portions of the hooks 18 engage in the grooves 19 in the peripheries of the rollers. When the rollers are rotated to this extent, the spring tongues 23 engage the shoulders 22, and as the lugs 20 are engaged in the notches 21 in the rollers reverse rotation of the rollers is prevented until the spring tongues 23 are disengaged from the notches. While in the drawings I have illustrated only one shoe, it will be readily understood that any desired number of shoes may be connected to a pneumatic tire, and if desired a leather facing may be connected to the inner face of the member 3 to prevent the same from cutting the material of the tire.

Having thus described my invention, what I desire to claim and secure by Letters Patent is:—

1. An anti-slipping shoe for vehicle wheels including a member curved to conform with the transverse curvature of a tire, rollers carried by the ends of said member, spaced lugs formed upon the outer face of said rollers, loops carried by the rollers and arranged in spaced relation to the lugs, a shoulder formed upon the periphery of each of said rollers, a bracket carried by the rim of the wheel, springs secured each at one end to the bracket, hooks carried by the free ends of the springs, said lugs and loops being adapted to coact with a tool, whereby the hooks may be engaged with the rollers, and spring members carried by the curved member and adapted for engagement with the shoulder on the periphery of each of the rollers whereby to prevent rotation of the same in one direction.

2. An anti-slipping shoe for vehicle wheels comprising a member curved to conform with the transverse curvature of a tire, rollers carried by the ends of the member, a bracket carried by the rim of the wheel, springs connected at one end with the bracket, hooks carried by the free ends of the springs, said hooks being adapted for engagement on the rollers carried on the ends of the member, against the tension of said springs, and means for preventing rotation of the rollers in one direction.

3. An anti-slipping shoe for vehicle wheels comprising an elliptical band curved transversely to conform with the curvature of the tire, bars connecting the sides of the band on opposite sides of the longitudinal center thereof, calks carried by the opposite ends of the bars, and a spider arranged between the medial portions of the sides of the band, as and for the purpose set forth.

In testimony whereof I hereunto affix my signature in the presence of two witnesses.

CLYDE J. PEAK.

Witnesses:
 J. A. MARTIN,
 C. C. MARTIN.